(12) United States Patent
Keyes

(10) Patent No.: US 8,955,236 B2
(45) Date of Patent: Feb. 17, 2015

(54) DEVICE FOR REMOVING LIQUID FROM A PART OF A VEHICLE

(76) Inventor: Gregory Keyes, Birmingham (GB)

( * ) Notice: Subject to any disclaimer, the term of this patent is extended or adjusted under 35 U.S.C. 154(b) by 330 days.

(21) Appl. No.: 13/509,522

(22) PCT Filed: Sep. 20, 2010

(86) PCT No.: PCT/GB2010/051568
§ 371 (c)(1),
(2), (4) Date: Aug. 1, 2012

(87) PCT Pub. No.: WO2011/058338
PCT Pub. Date: May 19, 2011

(65) Prior Publication Data
US 2012/0291307 A1    Nov. 22, 2012

(30) Foreign Application Priority Data
Nov. 13, 2009   (GB) .................................. 0919811.0

(51) Int. Cl.
*F26B 21/00*     (2006.01)
*B60R 1/06*      (2006.01)
*B60S 1/54*      (2006.01)
*B60S 1/56*      (2006.01)

(52) U.S. Cl.
CPC ................. *B60R 1/0602* (2013.01); *B60S 1/54* (2013.01); *B60S 1/56* (2013.01)
USPC ...... 34/371; 34/386; 34/90; 34/181; 359/509; 454/164

(58) Field of Classification Search
USPC ........... 34/386, 371, 427, 77.9, 181; 359/507, 359/509, 838; 454/124, 164
See application file for complete search history.

(56) References Cited

U.S. PATENT DOCUMENTS

| 4,538,851 | A |   | 9/1985  | Taylor |
| 4,570,287 | A | * | 2/1986  | Kerschner et al. .............. 15/346 |
| 4,898,458 | A | * | 2/1990  | McDonald .................... 359/509 |
| 4,963,011 | A | * | 10/1990 | Lu et al. ........................ 359/509 |
| 4,979,809 | A | * | 12/1990 | Peters .......................... 359/509 |
| 5,868,867 | A | * | 2/1999  | Clukey ........................... 134/37 |
| 5,903,389 | A | * | 5/1999  | Rumez et al. ................ 359/509 |
| 5,953,158 | A | * | 9/1999  | Kamakura et al. ............ 359/509 |

(Continued)

FOREIGN PATENT DOCUMENTS

CA   2466194 C  *  7/2007
DE   2704226         8/1978

(Continued)

OTHER PUBLICATIONS

PCT International Search Report and Written Opinion for PCT/GB2010/051568 mailed on Nov. 22, 2010.

*Primary Examiner* — Steve M Gravini
(74) *Attorney, Agent, or Firm* — Colin P. Cahoon; Shaukat A. Karjeker; Carstens & Cahoon, LLP

(57) ABSTRACT

A device for removing liquid from a part of a vehicle, the liquid removal device including an intake (11) for receiving matter containing gaseous component and non-gaseous components, a separator (14) for separating the gaseous and non gaseous components of matter entering the inlet (11), and an outlet (9, 10) for directing a gaseous component of the matter leaving the separator (14) towards the part of the vehicle from which liquid is to be removed, so as to remove liquid therefrom.

17 Claims, 12 Drawing Sheets

(56) References Cited

U.S. PATENT DOCUMENTS

| | | | |
|---|---|---|---|
| 6,290,361 B1 | 9/2001 | Berzin | |
| 6,749,306 B2 * | 6/2004 | Lindsay | 359/509 |
| 7,140,740 B1 * | 11/2006 | Cooper | 359/509 |
| 2012/0291307 A1 * | 11/2012 | Keyes | 34/427 |

FOREIGN PATENT DOCUMENTS

| | | | | |
|---|---|---|---|---|
| DE | 102007002567 | | 7/2008 | |
| EP | 2631394 | * | 8/2013 | |
| FR | 2912977 A1 | | 8/2008 | |
| GB | 2243586 A | | 6/1991 | |
| GB | 2358629 A | * | 8/2001 | C02F 11/12 |
| GB | 2 503 023 | * | 12/2013 | |
| JP | 09164921 A | | 6/1997 | |
| JP | 2003175806 | | 6/2003 | |
| JP | 2006036111 | | 2/2006 | |
| WO | 2009/098399 | | 8/2009 | |
| WO | WO 2011107435 A1 | * | 9/2011 | |
| WO | WO 2014036434 | * | 3/2014 | |

* cited by examiner

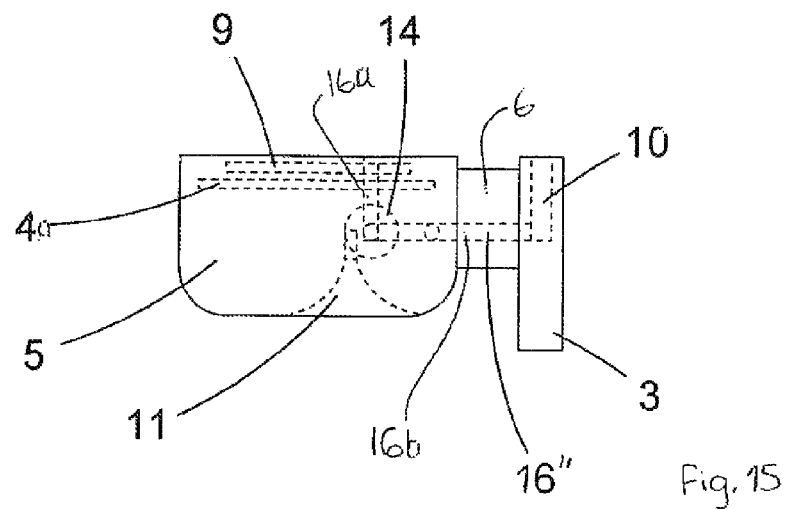
Fig. 15
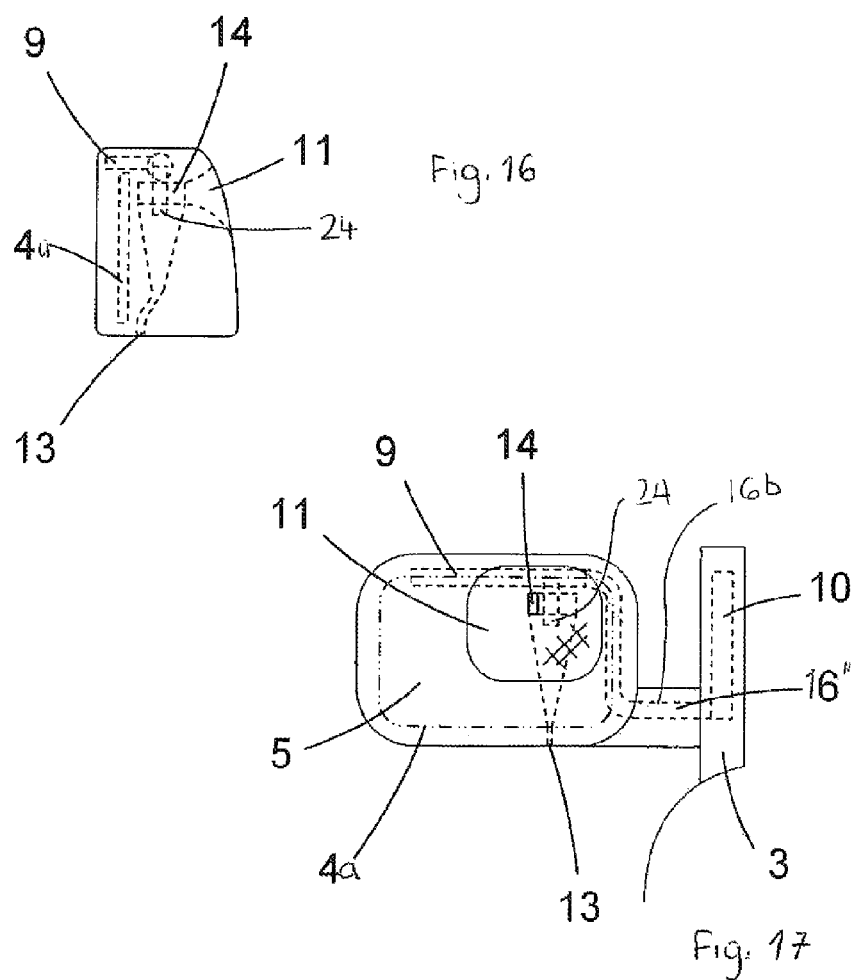
Fig. 16
Fig. 17

DEVICE FOR REMOVING LIQUID FROM A PART OF A VEHICLE

DESCRIPTION OF INVENTION

This invention relates to a device for removing liquid from a part of a vehicle, in particular, but not exclusively, to a device for removing liquid from an external rear-view mirror of a vehicle.

It is known that liquid, predominantly rainwater, collects on surfaces of vehicles. In the case of external rear-view mirrors and windows this can cause problems with visibility. Usually a driver of a vehicle is required to clear such mirrors and parts of windows manually.

Another solution to this problem is to provide heated mirrors or windows. A disadvantage of such devices is that they need to be maintained, are prone to failure and consume energy for prolonged periods of time.

In accordance with the present invention, there is provided a device for removing liquid from a part of a vehicle, the liquid removal device including an intake for receiving matter containing gaseous component and non-gaseous components, a separator for separating the gaseous and non gaseous components of matter entering the inlet, and an outlet for directing a gaseous component of the matter leaving the separator towards the part of the vehicle from which liquid is to be removed, so as to remove liquid therefrom.

An opening of the intake is preferably positioned on a part of the vehicle which faces a normal direction of travel of the vehicle, such that when the vehicle is moving in the normal direction of motion, matter is permitted to enter the opening of the intake. As long as there is relative movement between the vehicle and the surrounding matter, the device will operate. As the vehicle moves in the normal direction of travel, air will automatically enter the intake.

The separator may be a cyclonic separator, including a chamber having an inlet for receiving matter from the intake, a first outlet, through which the or each non-gaseous component separated from the matter is permitted to exit the chamber, and a second outlet which is fluidly communicable with the outlet of the liquid removal device. This device does not require an external source of power, other than the relative movement between the vehicle and the surrounding matter. There are no electrical or moving parts which require maintenance and can be prone to failure. The device is easy to clean and does not waste energy. Therefore it is environmentally friendly.

The chamber of the separator may be substantially frusto-conical and have a first end and a second end, the first end having a larger diameter than the second end.

Each of the inlet and the second outlet of the chamber may be positioned towards the first end of the chamber, and the first outlet may be positioned at the second end of the chamber.

The part of the vehicle from which liquid is to be removed may be an exterior rear-view mirror.

The part of the vehicle from which liquid is to be removed may be a portion of a window.

The portion of the window may be adjacent an external rear-view mirror. Therefore, removing liquid from the portion of the window provides a clearer view of the external rear-view mirror.

The device may include a plurality of outlets, for removing liquid from a corresponding number of parts of a vehicle.

The device may include two outlets, one for directing a gaseous component of the matter leaving the separator towards an external rear view mirror and one for directing a gaseous component of the matter towards a part of window which is adjacent the rear view mirror.

The separator may be operable to separate a non-gaseous component, a major proportion of which is air, from a non-gaseous component which includes liquid.

In accordance with a second aspect of the invention, there is provided an external rear-view mirror for a vehicle, including a device in accordance with the first aspect of the invention.

In accordance with a third aspect of the invention there is provided a vehicle including a device in accordance with the first aspect of the invention.

In accordance with a fourth aspect of the invention, there is provided a method of removing liquid from a part of a vehicle, including separating gaseous and non-gaseous components from matter which is moving relative to the vehicle when the vehicle is in motion, and directing the gaseous component of the matter towards the part of the vehicle from which liquid is to be removed.

The method may include removing liquid from at least one of an external rear-view mirror and a portion of a window of the vehicle.

The method may include separating at least one of liquid and debris from the gaseous component of the matter.

The method may be used where a major component of the matter is air.

The method may be used where the non-gaseous component includes at least one of liquid and debris.

BRIEF DESCRIPTION OF THE DRAWINGS

An embodiment of the invention will now be described, by way of example only, and with reference to the accompanying drawings, of which:

FIG. 15 is a plan view of the external rear-view mirror as shown in FIG. 13, showing parts of the fifth embodiment of the device which are internal to the external rear-view mirror in dotted lines;

FIG. 16 is a side view of the external rear-view mirror as shown in FIG. 13, showing parts of the fifth embodiment of the device which are internal to the external rear-view mirror in dotted lines;

FIG. 17 is a rear view of the external rear-view mirror as shown in FIG. 13, showing parts of the fifth embodiment of the device which are internal to the external rear-view mirror in dotted lines;

DETAILED DESCRIPTION

Figure 1:
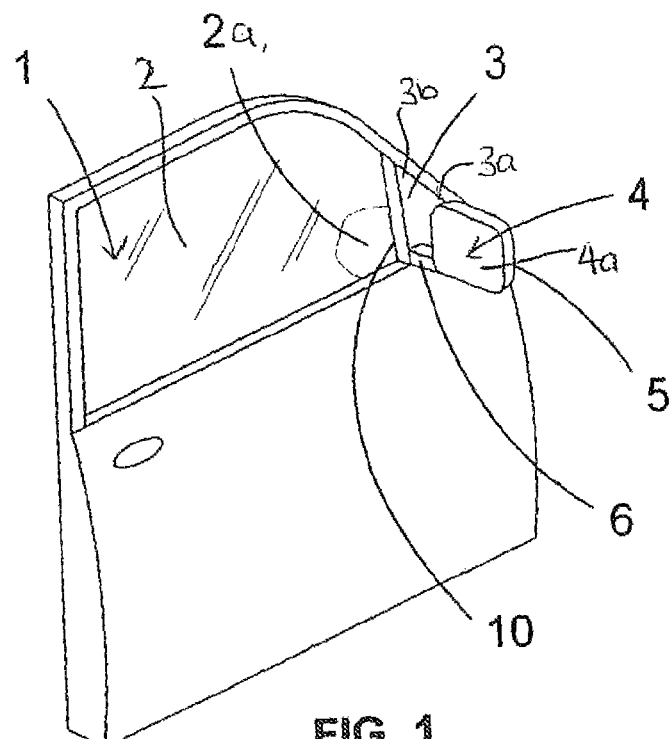
FIG. 1 is an illustrative perspective view of a vehicle door having an external rear-view mirror connected thereto.
Figure 2:
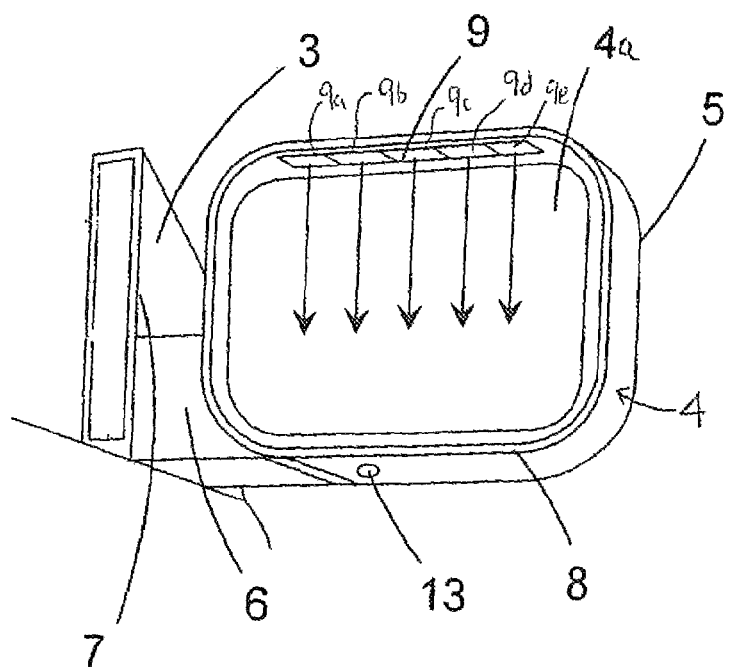
FIG. 2 is a more detailed illustrative view of the external rear-view mirror of FIG. 1, showing an outlet of a device in accordance with a first embodiment of the invention.
Figure 3:
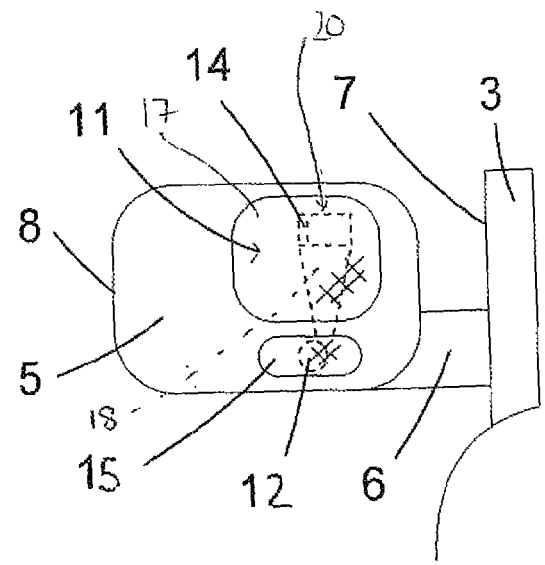
FIG. 3 is a rear view of the external rear-view mirror shown in FIG. 2, showing parts of the first embodiment of the device which are internal to the external rear-view mirror in dotted lines.
Figure 4:
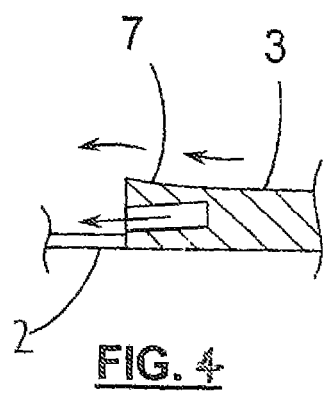
FIG. 4 is an illustrative cross-sectional view of a frame part of the door shown in FIG. 1.

Referring to FIG. 1, there is shown a part of a vehicle body, namely a car door 1 including a window 2. The door 1 also includes a frame part 3, which is substantially hollow and is positioned adjacent a leading edge of the window 2. The window 2 includes a portion 2a through which an external rear-view mirror 4 of the vehicle is viewed by a driver or a passenger of the vehicle. The external rear-view mirror 4 includes a reflective portion 4a (shown in FIG. 2) housed in a casing 5.

The external rear-view mirror 4 is connected to the vehicle body, in this case to the door 1, via a support arm 6. The support arm 6 extends substantially horizontally between the external rear-view mirror 4 and the frame part 3 of the door 1. The external rear-view mirror 4 extends substantially perpendicularly to the door 1, in a conventional manner.

Figure 5:
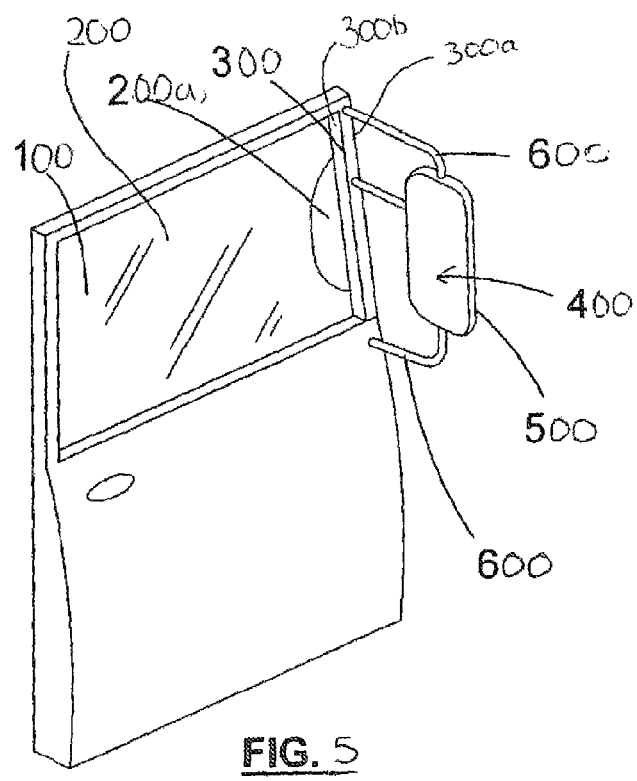
FIG. 5 is an illustrative perspective view of an alternative vehicle door having an external rear-view mirror connected thereto.
Figure 6:
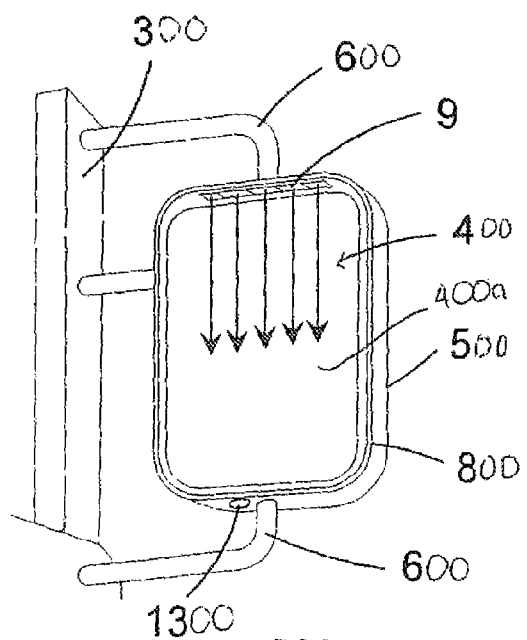
FIG. 6 is a more detailed perspective view of the external rear-view mirror of FIG. 5, showing an outlet of a device in accordance with a second embodiment of the invention.
Figure 7:
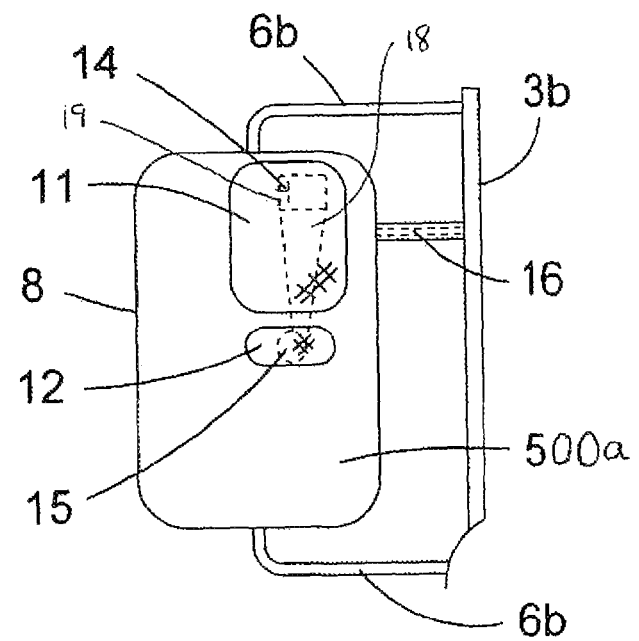
FIG. 7 is a rear view of the external rear-view mirror shown in FIG. 6, showing parts of the second embodiment of the device which are internal to the external rear-view mirror in dotted lines.
Figure 8:
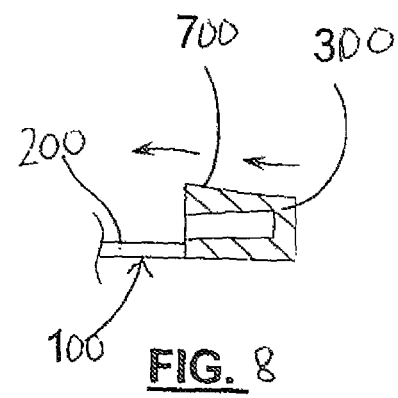
FIG. 8 is an illustrative cross-sectional view of a frame part of the door shown in FIG. 5.

A door 100 for a second type of vehicle, for example a lorry, is shown in FIG. 5. The door 100 includes a frame part 300, which is a substantially hollow upright member which is positioned adjacent a leading edge of the window 200. The frame part 300 is substantially rectangular in cross section. The window 200 includes a portion 200a, through which an external rear-view mirror 400 of the vehicle is viewed by a driver or a passenger of the vehicle. The external rear-view mirror 400 includes a reflective surface 400a housed in a casing 500.

The external rear-view mirror 400 is connected to a part of the vehicle body, in this case to the door 100, via a plurality of support arms 6. The support arms 600 extend substantially horizontally between the external rear-view mirror 400 and the frame part 300 of the door 100. The external rear-view mirror 400 extends substantially perpendicularly to the door 100, in a conventional manner.

The outer surface of the frame part 3, 300 of each window 2, 200 optionally is shaped so as to deflect rainwater and/or debris away from the portion 2a, 200a of the window 2, 200 when the vehicle is moving in a normal direction of travel. The second end 3b, 300b extends further in a direction which is substantially transverse to the plane of the window 2, 200, than the first end 3a, 300a, such that the first, leading end 3a, 300a is shallower than the second, trailing end 3b, 300b of the frame part. The outer surface of the frame part 3, 300 is generally curved. Alternatively, a lip 7, 700 may be provided at the second, trailing end 3b, of the frame part 3, so as to inhibit rainwater and/or debris from coming into contact with the portion 2a of the window 2, particularly when the vehicle is in motion, in the normal direction of travel.

Furthermore, the casing 5, 500 of the external rear-view mirror 4, 400 may include a peripheral lip 8, 800, for deflecting rainwater and/or debris away from the reflective surface 4a, 400a of the external rear-view mirror 4, 400.

The figures show a device for removing liquid from a part of the vehicle, hereinafter referred to as a liquid removal device.

Figure 18:
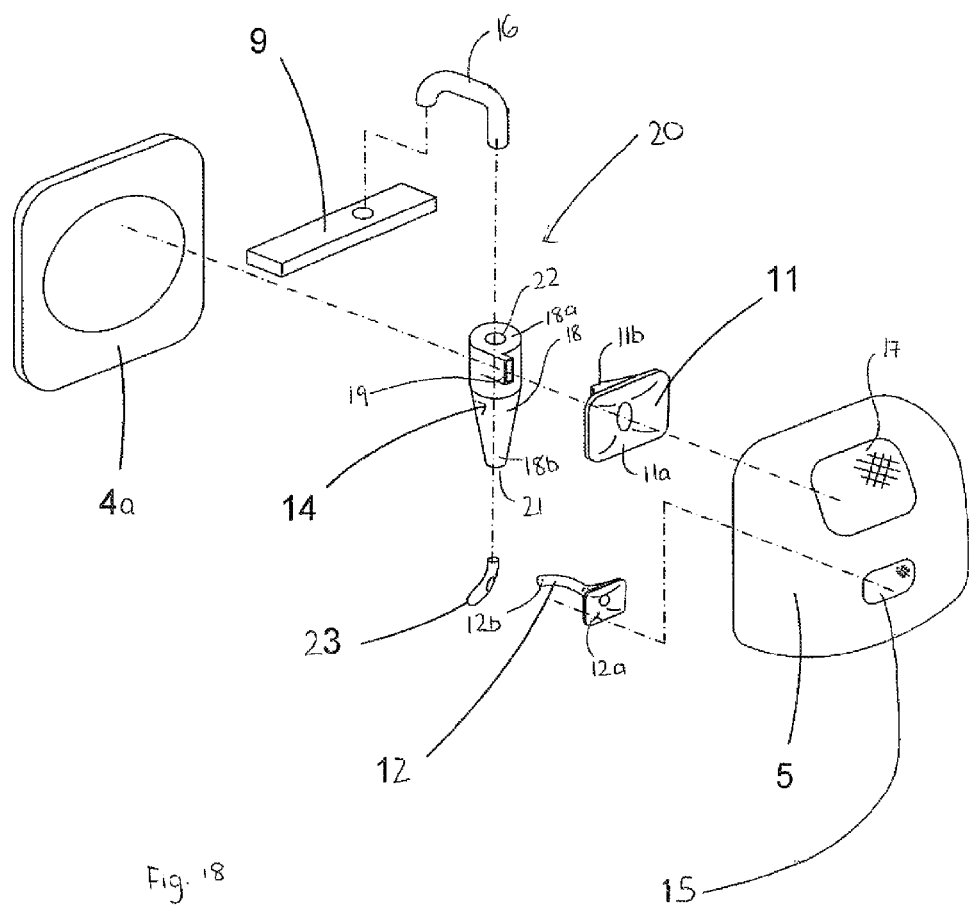
FIG. 18 is an exploded perspective view showing the parts of the device in accordance with the first embodiment of the invention.
Figure 19:
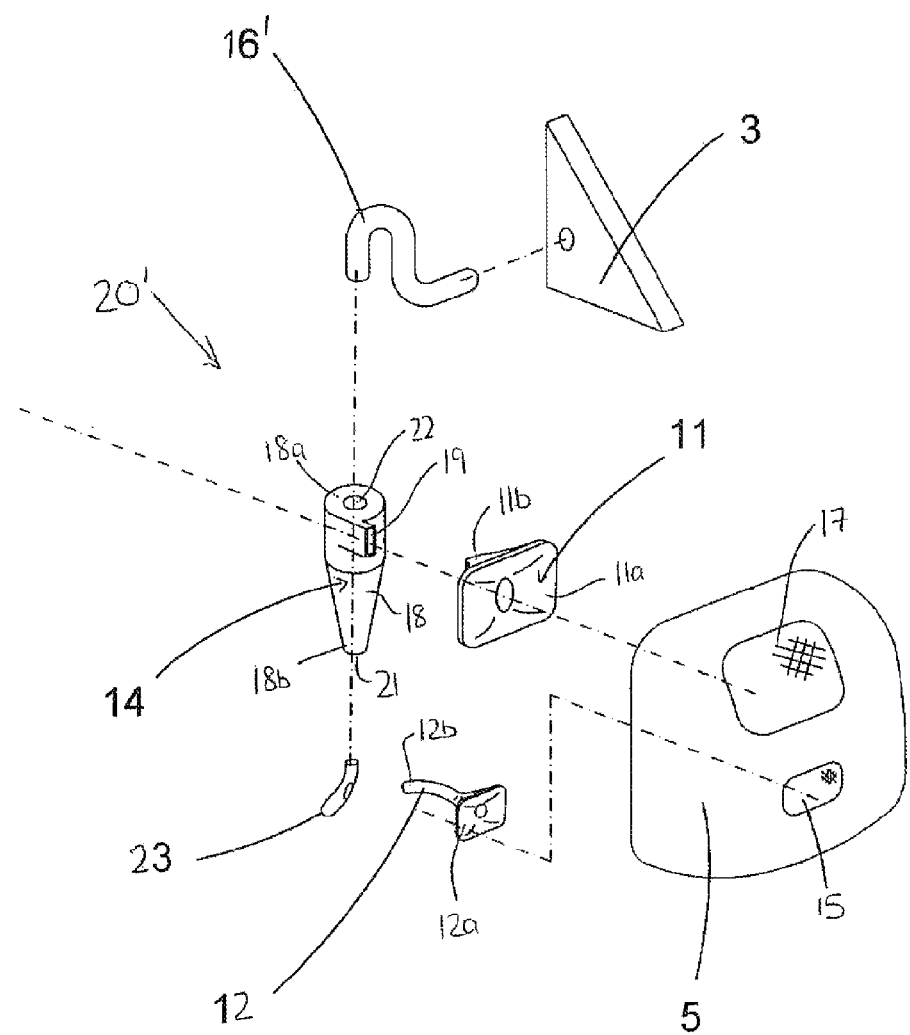
FIG. 19 is an exploded perspective view showing the parts of the device in accordance with the third embodiment of the invention.

In a first embodiment of the invention, the liquid removal device 20 is operable to remove liquid from the external rear-view mirror 4, of a car, particularly when the car moves in a normal direction of travel. A second embodiment of the invention includes similar features to the first embodiment, and functions in the same manner, as will be described in detail below. FIG. 18 shows the first embodiment, but it will be understood that the parts of the liquid removal device of the first embodiment correspond to the parts of the liquid removal device of the second embodiment. The first and second embodiments are described together.

The liquid removal device 20 includes an intake 11 for receiving matter containing a gaseous component mixed with a non-gaseous component, a separator 14 for separating the non-gaseous component of the matter from the gaseous component, and an outlet 9 through which the gaseous component of the matter may exit the liquid removal device 20. The outlet 9 directs the gaseous component of the matter towards a part of the vehicle from which fluid is to be removed, i.e. the external rear-view mirror 4, 400.

It will be appreciated that the gaseous component of the matter will be air or water vapour and will, in most cases, be the major component of the matter receivable in the intake 11. The non-gaseous component of the matter entering the separator 14 may include liquids, for example rainwater droplets, and/or solids, for example dust and/or other debris, including leaves and insects, which frequently come into contact with vehicles, particularly when in motion.

The intake 11 of the liquid removal device 20 has an opening at a first end 11a of the intake 11, which is positioned on an external surface 5a, 500a of the casing 5, 500 of the external rear-view mirror 4, 400. The opening faces the normal direction of travel of the vehicle. The opening at the first end 11a of the intake 11 is covered by a semi-permeable cover 17, which inhibits the ingress of relatively large particles, particularly solid particles, into the intake 11. The semi-permeable cover 17 is a grille or gauze. The intake 11 is tapered, such that the opening at the first end 11a is larger than a second end 11b of the intake 11.

Figure 21:
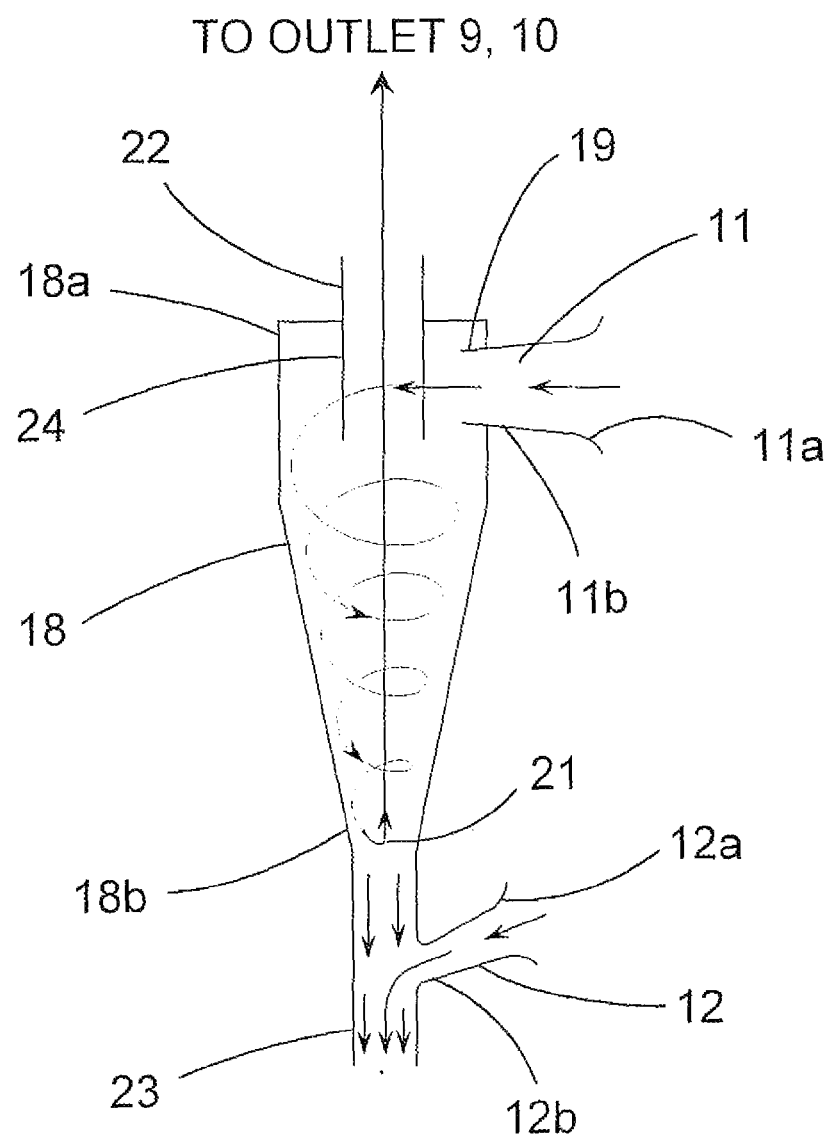
FIG. 21 is a cross-sectional view of the separator in accordance with each of the embodiments of the invention.

The second end 11b of the intake 11 is fluidly communicable with the separator 14 (as shown in FIG. 21) which is housed in the casing 5, 500 of the external rear-view mirror 4, 400. The separator 14 is a cyclone device, and includes a chamber 18. The chamber 18 is substantially frusto-conical and has a first end 18a, and a second end 18b. The first end 18a of the chamber has a larger diameter than the second end 18b.

The chamber 18 has a longitudinal axis which extends between the first end 18a and the second end 18b of the chamber 18. The chamber 18 has a substantially tangential inlet 19 positioned towards the first end 18a, through which matter is permitted to enter the chamber 18. The substantially tangential inlet 19 is fluidly communicable with the fluid intake 11.

The chamber 18 of the separator 14 has an outlet 21 hereinafter referred to as the first outlet 21, through which the non-gaseous component(s) separated from the matter by the separator 14 is permitted to leave the chamber 18. The first outlet 21 is positioned at the second end 18b of the chamber 18, and is substantially axial relative to the chamber 18. A duct 23, through which the non-gaseous component(s) is permitted to pass, extends between the first outlet 21 of the chamber 18 and an opening 13, 1300 in the casing 5, 500 of the external rear-view mirror 4, 400. The duct 23 extends generally downwardly, and the opening 13, 1300 is at a bottom of the casing 5, 500.

The chamber 18 of the separator 14 also includes a second outlet 22, through which the gaseous component of the matter which has been separated from the non-gaseous matter is permitted to leave the chamber 18. The second outlet 22 is positioned at the first end 18a of the chamber 18, and is oriented generally axially of the chamber 18, i.e. generally spaced from and aligned with the first outlet 21. A guide member 24 in the form of a tube extends from the second outlet 22, inwardly of the chamber 18, in a direction which is substantially aligned with the longitudinal axis of the chamber 18.

The second outlet 22 is fluidly communicable with the outlet 9 of the fluid removal device 20. In this embodiment of the invention a conduit 16 is provided which extends between the second outlet 22 and the outlet 9. The outlet 9 includes a plurality of openings which are adjacent the reflective surface 4a, 400a of the external rear-view mirror 4, 400. The openings of the outlet 9 are positioned adjacent an upper edge of the reflective surface 4a, 400a. However, it will be appreciated that the outlet 9 may have another orientation relative to the reflective surface 4a, 400a of the external rear-view mirror 4, 400. For example, the outlet 9 may be positioned towards one of the sides of the reflective surface 4a, 400a. The important aspect of the position of the outlet 9 is that the outlet 9 is capable of directing a non-gaseous component of matter leaving the fluid removal device 20 towards and on to the reflective surface 4a, 400a.

In use, as the vehicle moves in the normal direction of travel, matter including a gaseous component, such as air, and a non-gaseous component, such as a liquid, for example rainwater droplets, and/or one or more solid elements, for example dust or debris, is caused to enter the intake 11, as a result of the relative movement between the vehicle and the matter. Since the opening of the intake 11 is positioned on a rear surface 5a, 500a of the casing 5, 500, matter enters the intake 11. The semi-permeable cover 17 inhibits the ingress of relatively large particles into the intake 11. By virtue of the tapered nature of the intake 11, the matter which passes through the cover 17 is guided towards the substantially tangential inlet 19 of the separator 14.

The matter enters the chamber 18 at its first end 18a, and owing to shape of the chamber 18 and the fact that the inlet 19 is substantially tangential, the matter creates a vortex or cyclone, i.e. the matter is caused to circulate within the chamber 18. As the matter circulates around the chamber 18, it moves towards the second end 18b of the chamber 18. As the matter circulates, the non-gaseous component(s), which are heavier than the gaseous component of the matter, are separated from the gaseous matter, and fall under gravity towards the second end 18b of the chamber 18. The non-gaseous matter, e.g. rainwater droplets and debris, exits the chamber 18 through the first outlet 21, and leaves the casing 5, 500 of the external rear-view mirror 4, 400 via the duct 23 and the opening 13, 1300.

As is well known, once the gaseous component of the matter, i.e. the air, has reached the second end 18b of the chamber 18, it is deflected back towards the first end 18a of the chamber 18. The air moving towards the first end 18a of the chamber is substantially free from non-gaseous matter, i.e. liquid droplets and/or debris, and hence is relatively clean and dry. The gaseous matter is guided towards the second outlet 22 by the guide member 24. The gaseous matter leaves the chamber 18 via the second outlet 22 of the chamber 18 and is directed towards the outlet 9 of the liquid removal device 20. The air leaving the outlet 9 flows downwardly on to and along the reflective surface 4a, 400a of the external rear-view mirror 4, 400, so as to drive liquid, for example accumulated rainwater or condensation droplets, resting on the reflective surface 4a, 400a of the external rear-view mirror 4, 400, off the reflective surface 4a, 400a. An advantage of this arrangement is that driving the liquid downwards works in harmony with the gravitational force acting on the liquid.

In the example where the outlet 9 is positioned towards a side of the reflective surface 4a, 400a, the outlet 9 directs the air on to and laterally across the reflective surface 4a, 400a, rather than downwardly.

Figure 9:
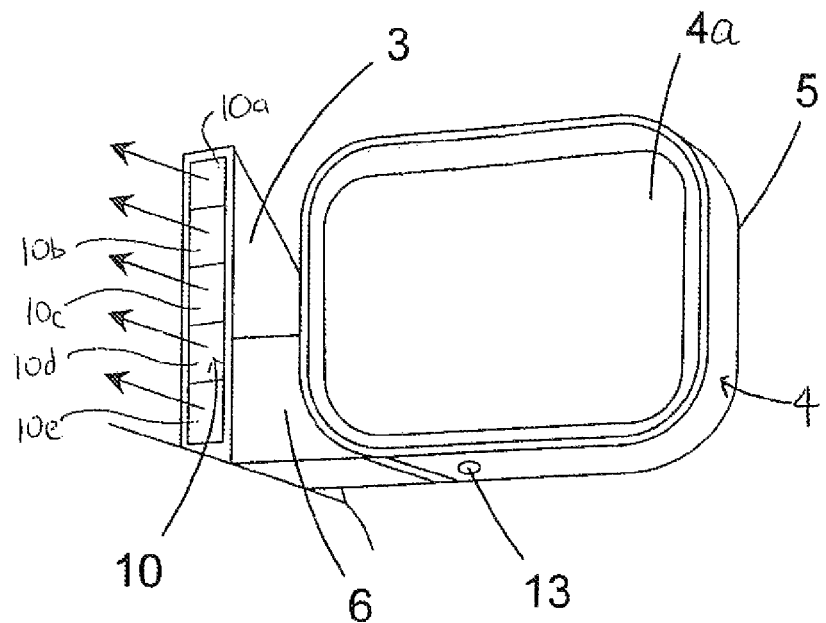
FIG. 9 is a detailed view of an external rear-view mirror of the type shown in FIG. 1, showing an outlet of a device in accordance with a third embodiment of the invention.
Figure 10:
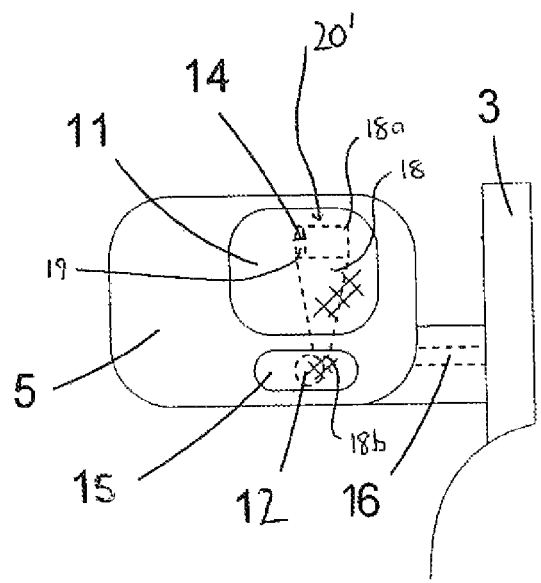
FIG. 10 is a rear view of the external rear-view mirror shown in FIG. 9, showing parts of the third embodiment of the device which are internal to the external rear-view mirror in dotted lines.
Figure 11:
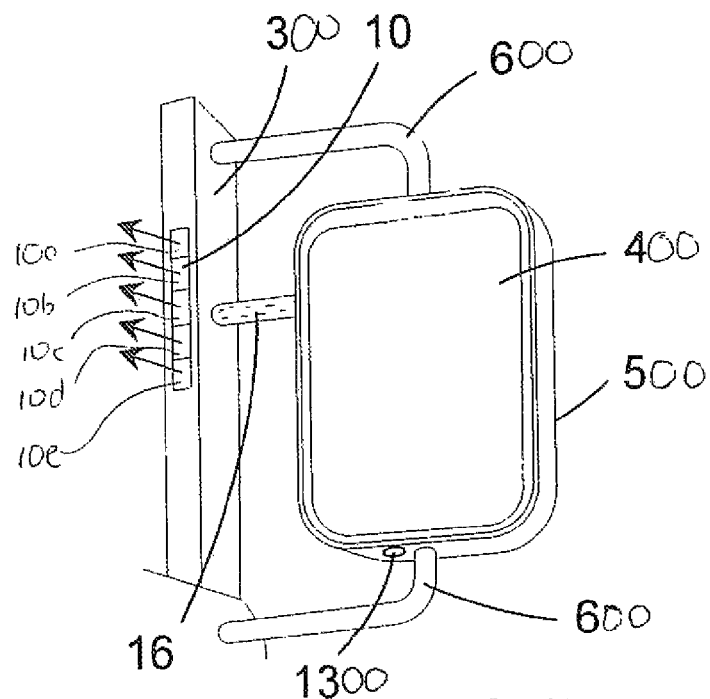
FIG. 11 is an illustrative perspective view of a fourth embodiment of the invention, which is associated with the external rear-view mirror shown in FIG. 5.
Figure 12:
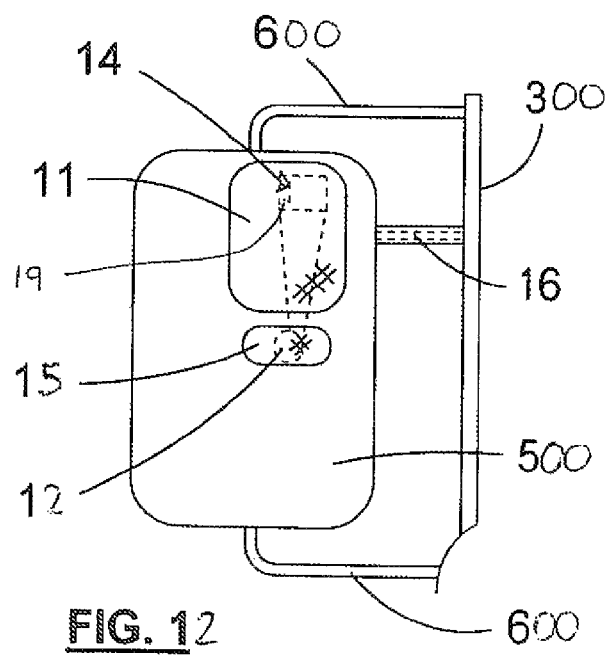
FIG. 12 is a rear view of the external rear-view mirror showing parts of the fourth embodiment of the device which are internal to the external rear-view mirror in dotted lines.
Figure 13:
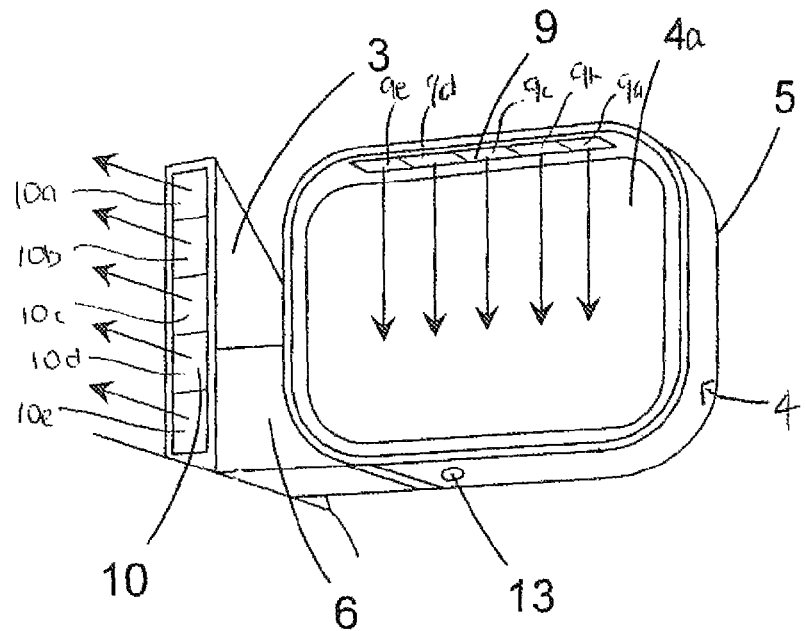
FIG. 13 is a detailed view of an external rear-view mirror of the type shown in FIG. 1, showing an outlet of a device in accordance with a fifth embodiment of the invention.
Figure 14:
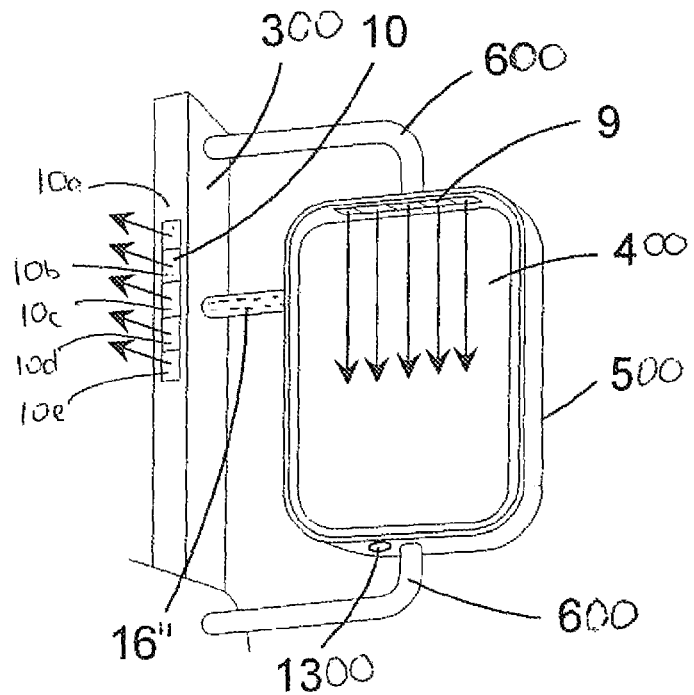
FIG. 14 is a detailed view of an external rear-view mirror of the type shown in FIG. 5, showing an outlet of a device in accordance with a sixth embodiment of the invention.

A third embodiment of the invention is shown generally at 20' in FIGS. 9 and 10, and a fourth embodiment is shown generally at 20' in FIGS. 11 and 12. The features of the device in the third and fourth embodiments are similar, but are suitable for use with different types of vehicle. The third embodiment is suitable for use with the external rear-view mirror 4 of a car, and the fourth embodiment is suitable for use with the external rear-view mirror 400 of a lorry (or other large vehicle). Parts of the device 20' which are identical to those of the device 20 are numbered with reference numerals corresponding to those used in relation to the first and second embodiments, and parts which are similar are numbered with the same reference numerals, but with the addition of a prime symbol. The second embodiment of the invention is applicable to all types of vehicle.

The third and fourth embodiments of the invention are operable to remove liquid from a portion 2a, 200a of a window 2, 200 of a vehicle, rather than from the reflective surface 4a, 400a of an external rear-view mirror 4, 400. The intake 11, and the separator 14 are positioned within the casing 5, 500 of the external rear-view mirror 4, 400 and are the same as those of the first embodiment. However the second outlet 22 of the chamber 18' is fluidly communicable with an outlet 10 of the device 20', which is positioned substantially adjacent the portion 2a, 200a of the window 2, 200. The second outlet 22 of the chamber 18 is connected to the outlet 10 by a conduit 16'. The conduit 16' extends through the support arm 6, or one of the support arms 600 which supports the external rear-view mirror 4, 400 on the vehicle body. Alternatively, the conduit 16' may extend between the external rear-view mirror 4, 400 and the frame part 3, 300 separately from the support arm 6, 600.

The outlet 10 extends through the frame part 3, 300 and includes a plurality of openings 10a-e, which are separated by walls which are relatively thin compared with the dimensions of the openings 10a-e. It will be appreciated that any number of openings, including a single opening, may be provided. The walls of the outlet 10 are angled so as to direct a gaseous component which has been separated from the matter drawn into the fluid removal device 20', towards and on to the portion 2a, 200a of the window 2, 200.

In use, the liquid removal device 20' operates in substantially the same manner as the device 20'. However, the relatively clean, dry gaseous matter which leaves the chamber 18 via the second outlet 22 of the chamber 18 moves towards the outlet 10 of the liquid removal device 20', via the conduit 16. The air leaving the outlet 10 flows in a direction which is substantially opposite the normal direction of travel of the vehicle, and is directed towards and on to the portion 2a, 200a of the window 2, 200 from which liquid is to be removed. Liquid, for example accumulated rainwater or condensation droplets, resting on the portion 2a, 200a of the window 2, 200 is driven towards the rear of the vehicle, away from the portion 2a, 200a of the window 2, 200, in order to provide an occupant of the vehicle with a clearer view of the external rear-view mirror 4, 400 which is adjacent the portion 2a, 200a of the external rear-view mirror 4, 400.

Figure 20:
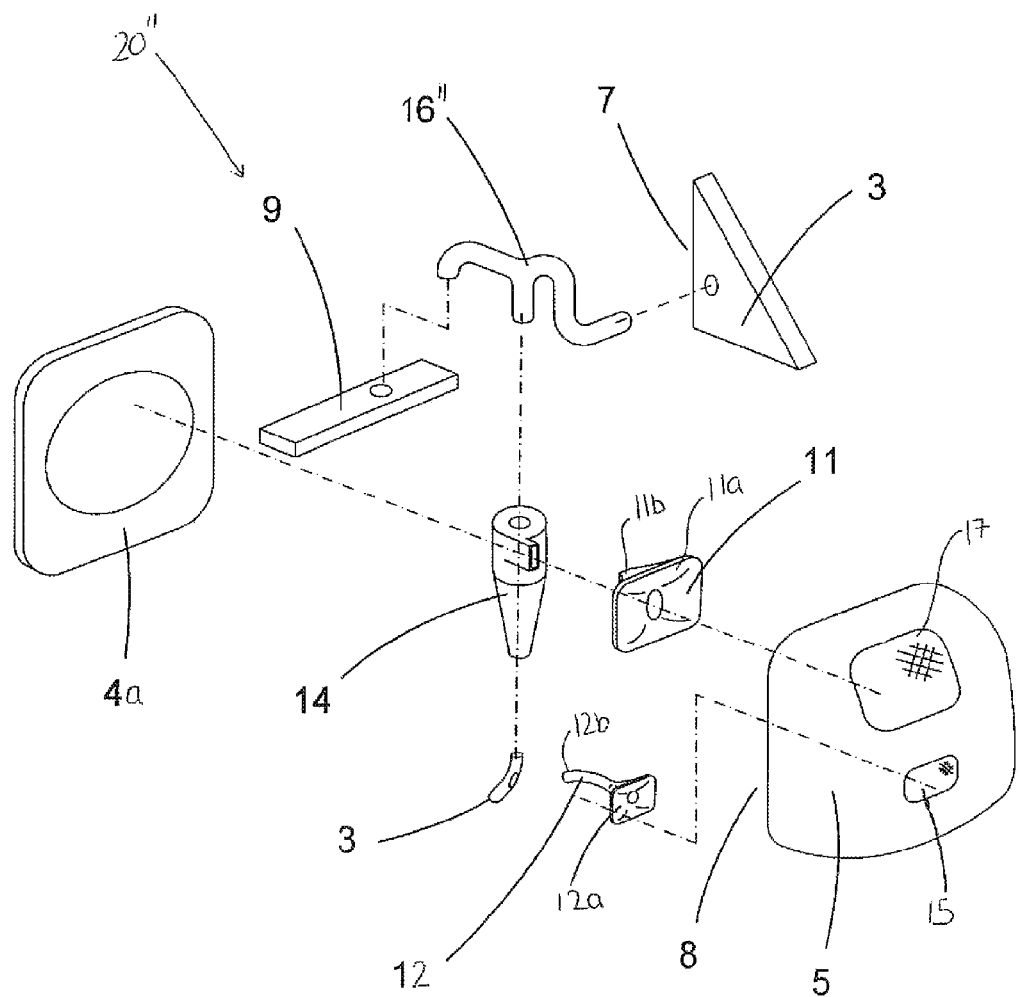
FIG. 20 is an exploded perspective view showing parts of the device in accordance with the fifth embodiment of the invention.

Fifth and sixth embodiments of the invention are shown generally at 20" in FIGS. 13-17, and in FIG. 20. The fifth embodiment of the invention is operable to remove liquid from two parts of a car, and the sixth embodiment of the invention is operable to remove liquid from two parts of a lorry or other large vehicle, particularly when the car or lorry moves in a normal direction of travel. Features of the fifth and sixth embodiments of the invention which are common to the first to fourth embodiments are denoted with the same reference numerals. Features which are similar are denoted with the same reference numerals but identified with a double prime symbol.

The liquid removal device 20" includes an outlet 9 and an outlet 10, such that the device is operable to remove liquid from both the reflective surface 4a of the external rear-view mirror 4' and from the portion 2a, 200a of the window 2, 200. The intake 11 and separator 14 are the same as in the first to fourth embodiments. However, the liquid removal device 20" includes a conduit 16" having a first part 16a for carrying air from the second outlet 22 of the separator 14 to the outlet 9 and a second part 16b for carrying air from the second outlet 22 of the separator 14 to the outlet 10.

In use, the liquid removal device 20" operates in substantially the same manner as the first to fourth embodiments of the invention, in that non-gaseous components of matter which are drawn into the intake 11 are separated from the gaseous components of the matter and exit the liquid removal device via the duct 23 and the opening 13, 1300. However, the gaseous component of the matter which leaves the chamber 18 of the separator 14 via the outlet 22, i.e. the relatively clean, dry air, is divided by the conduit 16", such that a proportion of the air travels along the first part 16a of the conduit 16" towards the outlet 9 which is adjacent the reflective surface 4a, 400a of the external rear-view mirror 4, 400, and a proportion of the air travels towards the outlet 10" which is adjacent the portion 2a, 200a of the window 2, 200. The air leaving the outlets 9 and 10 comes into contact with the respective part of the vehicle from which liquid is to be removed, and travels along a surface thereof. Thus liquid is removed from both the reflective surface 4a, 400a of the external rear-view mirror 4, 400 and the portion 2a, 200a of the window 2, 200.

An additional, optional feature, which may be added to any of the embodiments of the invention described above, is an efficiency improvement device. As shown most clearly in FIG. 18, the efficiency improvement device includes a second intake 12, having a first end 12a, and a second end 12b. The intake 12 has an opening at its first end 12a, which is positioned on an external surface 5a, 500a of the casing 5, 500a of the external rear-view mirror 4, 400, generally below the opening of the first intake 11. The dimensions of the intake 12, including those of its opening, are smaller than the corresponding dimensions of the intake 11.

The opening at the first end 12a of the intake 12 faces the normal direction of travel of the vehicle and is covered by a semi-permeable cover 15, which inhibits the ingress of relatively large particles, particularly solid particles, into the intake 12. The semi-permeable cover 15 is a grille or gauze. The intake 12 is tapered, such that the opening at the first end 12a is larger than a second end 12b of the intake 12. The intake 12 is connected to and fluidly communicable with the duct 23, through which non-gaseous components of matter drawn through the liquid removal device 20, 20', 20" exit the device 20, 20', 20".

In use, as the vehicle moves relative to the surrounding air, in the normal direction of travel, matter, predominantly air, is drawn into intake 12, as well as into the intake 11. The matter which enters the intake 11 is separated in the normal way, and the non-gaseous components exit the liquid removal device 20, 20', 20" via the duct 23, whilst the gaseous component is transported to the or each outlet 9, 10. The air which is received by the second intake 12 is delivered to the duct 23, at a position beneath the outlet 21 of the chamber 18. The movement of air through the second intake 12 and the duct 23 causes non-gaseous components to be drawn through the duct 23, by virtue of the lower pressure in the duct 23, such that the matter in the separator 14 is separated more quickly than if the non-gaseous components were to fall through the duct 23 under gravity alone.

Although the invention has been described in terms of the vehicle moving in the normal direction of travel, it will be appreciated that the liquid removal device 20, 20', 20" is capable of operating in the event of any relative movement between the vehicle and the surrounding air. For example, even if the vehicle is stationary, and indeed even if the vehicle is unoccupied and electrical power etc. is switched off, in the event of a wind moving air in a direction opposite to the normal direction of travel of the vehicle, the air (and any attendant liquid/debris) will enter the intake, be cleaned and/or dried by the separator and then directed to the part(s) of the vehicle from which liquid is to be removed.

It will be appreciated that in each of the embodiments of the invention, the parts of the liquid removal device 20, 20', 20" are substantially housed within existing parts of the vehicle. Therefore, the liquid removal device can be retro-fitted to an existing vehicle. Also, the liquid removal device 20, 20', 20" is not exposed, and thus is not unsightly, and is protected from damage. Furthermore, the liquid removal device 20, 20' 20" does not have any moving or electrical parts, thus minimising the risk of failure, and rendering the device virtually maintenance free, and easily reparable.

The part of the vehicle which is to be cleared of liquid may be different from those described above, for example a rear windscreen, or any other part, as required.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:
1. A device for removing liquid from a part of a vehicle, the liquid removal device including an intake for receiving matter containing gaseous components and non-gaseous components, a separator for separating the gaseous and nongaseous components of matter entering the inlet, and an outlet for directing a gaseous component of the matter leaving the separator towards the part of the vehicle from which liquid is to be removed, so as to remove liquid therefrom;

wherein the separator is a cyclonic separator including a chamber having an inlet for receiving matter from the intake, the chamber having a first outlet configured to allow exiting there though of the non-gaseous components separated from the matter, and a second outlet in fluid communication with the outlet of the liquid removal device.

2. A device according to claim 1 wherein an opening of the intake is positioned on a part of the vehicle which faces a normal direction of travel of the vehicle, such that when the vehicle is moving in the normal direction of motion, matter is permitted to enter the opening of the intake.

3. A device according to claim 1 wherein the chamber of the separator is substantially frusto-conical and has a first end and a second end, the first end having a larger diameter than the second end.

4. A device according to claim 3 wherein each of the inlet and the second outlet of the chamber is positioned towards the first end of the chamber, and the first outlet is positioned at the second end of the chamber.

5. A device according to claim 1 wherein the part of the vehicle from which liquid is to be removed is an exterior rear-view mirror.

6. A device according to claim 1 wherein the part of the vehicle from which liquid is to be removed is a portion of a window.

7. A device according to claim 6 wherein the portion of the window is adjacent an external rear-view mirror.

8. A device according to claim 1 wherein the device includes a plurality of outlets, for removing liquid from a corresponding number of parts of a vehicle.

9. A device according to claim 8 wherein the device includes two outlets, one for directing a gaseous component of the matter leaving the separator towards an external rear view mirror and one for directing a gaseous component of the matter towards a part of window which is adjacent the rear view mirror.

10. A device according to claim 1 wherein the separator is operable to separate at a non-gaseous component, a major proportion of which is air, from a non-gaseous component which includes liquid.

11. An external rear-view mirror for a vehicle including a device in accordance with claim 1.

12. A vehicle including a device in accordance with claim 1.

13. A method of removing liquid from a part of a vehicle, including separating gaseous and non-gaseous components from matter which is moving relative to the vehicle when the vehicle is in motion, and directing the gaseous component of the matter towards the part of the vehicle from which liquid is to be removed;

wherein the step of separating takes place in a cyclonic separator, the cyclonic separator including a chamber having an inlet for receiving matter, the chamber having a first outlet configured to allow exiting there though of the non-gaseous components separated from the matter, and a second outlet for exiting of non-gaseous components.

14. A method according to claim 13 including removing liquid from at least one of an external rear-view mirror and a portion of a window of the vehicle.

15. A method according to claim 13 including separating at least one of liquid and debris from the gaseous component of the matter.

16. A method according to claim 13 wherein a major component of the matter is air.

17. A method according to claim 13 wherein the non-gaseous component includes at least one of liquid and debris.

* * * * *